(12) United States Patent
Attali et al.

(10) Patent No.: US 7,831,196 B2
(45) Date of Patent: Nov. 9, 2010

(54) AUTOMATIC ESSAY SCORING SYSTEM

(75) Inventors: Yigal Attali, Lawrenceville, NJ (US);
Jill Burstein, Princeton, NJ (US);
Vyacheslav Andreyev, Ewing, NJ (US)

(73) Assignee: Educational Testing Service, Princeton, NJ (US)

(*) Notice: Subject to any disclaimer, the term of this patent is extended or adjusted under 35 U.S.C. 154(b) by 1002 days.

(21) Appl. No.: 10/974,530

(22) Filed: Oct. 27, 2004

(65) Prior Publication Data
US 2005/0142529 A1    Jun. 30, 2005

Related U.S. Application Data

(60) Provisional application No. 60/514,814, filed on Oct. 27, 2003.

(51) Int. Cl.
*G09B 11/00* (2006.01)
(52) U.S. Cl. ..................................... 434/353
(58) Field of Classification Search ............. 434/335, 434/353, 307 R, 323, 350
See application file for complete search history.

(56) References Cited

U.S. PATENT DOCUMENTS

| | | | |
|---|---|---|---|
| 6,115,683 A | 9/2000 | Burstein et al. | |
| 6,181,909 B1 | 1/2001 | Burstein et al. | |
| 6,366,759 B1 | 4/2002 | Burstein et al. | |
| 2002/0142277 A1 | 10/2002 | Burstein et al. | |
| 2003/0200077 A1* | 10/2003 | Leacock et al. | 704/1 |
| 2004/0175687 A1 | 9/2004 | Burstein et al. | |

OTHER PUBLICATIONS

Mann et al., *Rhetorical Structure Theory: Toward a Functional Theory of Text Organization*, Text 8(3): 243-281, 1988.
Cohen, *A Computational Theory of the Function of Clue Words in Argument Understanding*, Proceedings of 1984 International Computational Linguistics Conference, California, 251-255, 1984.
Hovy et al., *Employing Knowledge Resources in a New Text Planner Architecture*, Aspects of Automated NL Generation, Dale, Hony, Rosner and Stoch (Eds.), Springer-Verlag Lecture Notes in AI No. 587, 57-72, 1992.
Hirschberg et al., *Empirical Studies on the Disambiguation of Cue Phrases*, Computational Linguistics, 501-530, 1993.

(Continued)

*Primary Examiner*—Kathleen Mosser
(74) *Attorney, Agent, or Firm*—Jones Day

(57) ABSTRACT

A method of grading an essay using an automated essay scoring system is provided. The method comprises the steps of deriving a set of predetermined features from the essay, wherein the predetermined feature set comprises one or more features that are independent from the test prompt, scoring the feature set with a scoring equation, wherein a multiple regression analysis with graded essay data produces weights for the scoring equation, generating a raw score for the essay; and processing the raw score for the essay into a score category based on an adaptive cutoff algorithm. Also provided is a method of generating a model in which to grade essays, wherein the data used to generate the model is independent from the test prompt or essay topic.

36 Claims, 2 Drawing Sheets

OTHER PUBLICATIONS

Vander et al., *Expressing Rhetorical Relations in Instructional Text: A Case Study in Purpose Relation*, Computational Linguistics 21(1): 29-57, 1995.

Page et al., *The Computer Moves into Essay Grading: Updating the Ancient Test*, Phi Delta Kappa, Mar. 1995, 561-565 (abstract).

Page, et al., *Computer Analysis of Student Essays: Finding Trait Differences in Student Profile*; Annual Meeting of the American Research Association in Chicago, IL; Mar. 1997.

Breland, Hunter, M., et al., *The College Board Vocabulary Study*, ETS Report No. 94-26, College Entrance Examination Board, 1994, pp. 1-51.

Burstein, Jill, et al., *Criterion$^{SM}$ Online Essay Evaluation: An Application for Automated Evaluation of Student Essays*, Proceedings of the Fifteenth Annual Conference on Innovative Applications of Artificial Intelligence, Aug. 2003, 8 pages.

\* cited by examiner

AUTOMATIC ESSAY SCORING SYSTEM

RELATED APPLICATIONS AND CLAIM OF PRIORITY

This application claims priority to, and incorporates by reference in full U.S. Provisional Patent Application No. 60/514,814, filed Oct. 27, 2003.

BACKGROUND OF THE INVENTION

For many years, standardized tests have been administered to examinees for various reasons such as for educational testing or for evaluating particular skills. For instance, academic skills tests, e.g., SATs, LSATs, GMATs, etc., are typically administered to a large number of students. Results of these tests are used by colleges, universities and other educational institutions as a factor in determining whether an examinee should be admitted to study at that particular institution. Other standardized testing is carried out to determine whether or not an individual has attained a specified level of knowledge, or mastery, of a given subject. Such testing is referred to as mastery testing, e.g., achievement tests offered to students in a variety of subjects, and the results are used for college credit in such subjects.

Many of these standardized tests have essay sections. Essay questions, however, are commonly looked upon as providing a more well-rounded assessment of a particular test taker's abilities. These essay portions of an exam typically require human graders to read the wholly unique essay answers. As one might expect, essay grading requires a significant number of work-hours, especially compared to machine-graded multiple choice questions. It is, therefore, desirable to provide a computer-based automatic scoring system to evaluate written student essays more efficiently.

Typically, essays are graded based on scoring rubrics, i.e., descriptions of essay quality or writing competency at each score level. For example, the scoring rubic for a scoring range from 0 to 6 specifically states that a "6" essay "develops ideas cogently, organizes them logically, and connects them with clear transitions." A human grader simply tries to evaluate the essay based on descriptions in the scoring rubric. This technique, however, is subjective and can lead to inconsistent results. It is, therefore, desirable to provide an automatic scoring system that is accurate, reliable and yields consistent results.

Literature in the field of discourse analysis points out that lexical (word) and structural (syntactic) features of discourse can be identified (Mann, William C. and Sandra A. Thompson (1988): Rhetorical Structure Theory: Toward a functional theory of text organization, Text 8(3), 243-281) and represented in a machine, for computer-based analysis (Cohen, Robin: A computational theory of the function of clue words in argument understanding, in "Proceedings of 1984 International Computational Linguistics Conference." California, 251-255 (1984); Hovy, Eduard, Julia Lavid, Elisabeth Maier, Vibhu Nettal and Cecile Paris: Employing Knowledge Resources in a New Text Planner Architecture, in "Aspects of Automated NL Generation," Dale, Hony, Rosner and Stoch (Eds), Springer-Veriag Lecture Notes in A1 no. 587, 57-72 (1992); Hirschberg, Julia and Diane Litman: Empirical Studies on the Disambiguation of Cue Phrases, in "Computational Linguistics" (1993), 501-530 (1993); and Vander Linden, Keith and James H. Martin: Expressing Rhetorical Relations in Instructional, Text: A Case Study in Purpose Relation in "Computational Linguistics" 21(1), 29-57 (1995)).

Previous work in automated essay scoring, such as by Page, E. B. and N. Petersen: The computer moves into essay grading: updating the ancient test. Phi Delta Kappa; March, 561-565 (1995), reports that predicting essay scores using surface feature variables, e.g., the fourth root of the length of an essay, shows correlations as high as 0.78 between a single human rater (grader) score and machine-based scores for a set of PRAXIS essays. Using grammar checker variables in addition to word counts based on essay length yields up to 99% agreement between machine-based scores that match human rater scores within 1 point on a 6-point holistic rubric. These results using grammar checker variables have added value since grammar checker variables may have substantive information about writing competency that might reflect rubric criteria, such as whether the essay is free from errors in mechanics, and whether proper usage and sentence structure are present.

U.S. Pat. Nos. 6,181,909 and 6,366,759, both of which are assigned to Educational Testing Service, the assignee of the present application and are herein incorporated by reference in their entirety, provide automated essay grading systems. For example in U.S. Pat. No. 6,181,909, a method includes the automated steps of (a) parsing the essay to produce parsed text, wherein the parsed text is a syntactic representation of the essay, (b) using the parsed text to create a vector of syntactic features derived from the essay, (c) using the parsed text to create a vector of rhetorical features derived from the essay, (d) creating a first score feature derived from the essay, (e) creating a second score feature derived from the essay, and (f) processing the vector of syntactic features, the vector of rhetorical features, the first score feature, and the second score feature to generate a score for the essay. In the 6,181,909 Patent, the essay is graded in reference to prompt specific human graded essays, wherein the human graded essays are written in response to a specific essay prompt, and are analyzed according to the same features as the essay to be graded. The essay scoring system includes several feature analysis programs which may evaluate essays based on syntactic features, rhetorical features, content features, and development/organizational features. The essay is graded based on a holistic grading scale, e.g., 1-6 scoring categories.

In known essay scoring engines, a set of four critical feature variables is used to build a final linear regression model used for predicting scores, referred to as predictor variables. All predictor variables and counts of predictor variables are automatically generated by several independent computer programs. In these scoring engines, all relevant information about the variables are introduced into a stepwise linear regression in order to evaluate the predictive variables, i.e., the variables that account for most of the variation between essays at different score intervals.

In U.S. Pat. No. 6,366,759, another essay grading system using an automated essay scoring system, the essay being a response to a test question. The steps include (a) deriving a vector of syntactic features from the essay; (b) deriving a vector of rhetorical features from the essay; (c) deriving a first score feature from the essay; (d) deriving a second score feature from the essay; and (e) processing the vector of syntactic features, the vector of rhetorical features, the first score feature, and the second score feature to generate a score for the essay. In the 6,366,759 Patent, the essay is graded in reference to prompt specific human graded essays, wherein the human graded essays are written in response to a specific essay prompt, and are analyzed according to the same features as the essay to be graded. The essay scoring system includes several feature analysis programs which may evaluate essays based on syntactic features, rhetorical features, content features, and development/organizational features. The essay is graded based on a holistic grading scale, e.g., 1-6 scoring categories.

There is a need to develop systems and methods to automatically evaluate and grade essays and texts, wherein the score of the automatic analysis corresponds greatly with human-based scoring, wherein the scoring does not require voluminous sample data in order to complete the automatic grading, wherein a set of features is developed to accurately evaluate an essay, wherein the feature set may be standardized, wherein the scoring model used to evaluate and essay is re-usable across multiple essay prompts, and wherein grading may be more standardized across all essay prompts.

SUMMARY OF THE INVENTION

The present systems and methods therefore, solve one or more of the needs detailed above. One embodiment of the invention a method of grading an essay using an automated essay scoring system is described. The method steps comprise: (a) deriving a set of predetermined features from the essay, wherein the predetermined features comprises one or more features that are independent from the test prompt; (b) scoring the feature set with a scoring equation, wherein a multiple regression analysis with graded essay data produces weights for the scoring equation; (c) generating a raw score for the essay from the scoring equation; and (d) processing the raw score for the essay into a score category based on an adaptive cutoff algorithm.

In an embodiment, the score categories range may be a numerical range from a lower bound (e.g., 1) to an upper bound (e.g., 6). In alternative embodiments, the score categories may span non-numerical ranges. In embodiments, deriving a vector of set features from the essay may include automated analysis of the essay for grammar, usage, mechanics, and stylistic errors. In embodiments, deriving a vector of set features from the essay may include automated analysis of the essay for essay organization and development through language processing methods. The organization and development of the essay may be evaluated by identifying sentences in the essay that correspond to one discourse element selected from the group consisting of background sentences, thesis sentences, main idea sentences, supporting idea sentences and conclusion sentences. In embodiments, deriving a vector of set features from the essay may include automated analysis of a word frequency index, a ratio of word types to tokens, and total word count. In embodiments, deriving a vector of set features from the essay may include comparing word usage of the essay to a batch of essays scored over the range of score categories to determine one or more features.

In embodiments, the feature set comprises 12 features. The feature set may include the following 12 features: (1) length of the essay in total number of words, (2) percent of grammar errors with regard to total number of words, (3) percent of usage errors with regard to total number of words, (4) percent of mechanics errors with regard to total number of words, (5) percent of style feedback comments with regard to total number of words, (6) optimal number of discourse elements, wherein discourse elements are selected from the group consisting of background sentences, thesis sentences, main idea sentences, supporting idea sentences and conclusion sentences, (7) average word length of discourse elements, (8) score category to which the essay text is most similar with regard to vocabulary usage, (9) similarity of the essay vocabulary to the vocabulary used in essays scored in the highest score category, (10) ratio of number of words types to tokens in an essay, (11) vocabulary level, and (12) average word length.

In embodiments, the vocabulary features (9) and (10) may be evaluated using a cosine comparison analysis of the essay to be graded to previously graded essays (either human or machine graded) in each score category. For example, a detailed method of evaluating vocabulary features (9) and (10) may include: (1) generating argument partitioned text from the essay, said argument partitioned text comprising a structure identifier describing an aspect of the argument structure of the sentence; (2) for each of a plurality of score categories, each score category having a plurality of score category essays, creating a word weight vector for each of a set of argument words in the plurality of score categories essays; (3) creating a word weight vector for each of a set of argument words in the essay; (4) computing for each of the set of argument words in the essay, a cosine correlation between the argument word weight vector for a particular argument word in the essay and the word weight vector for the same argument word in the plurality of score category essays; and (5) assigning to each of the set of argument words in the essay the score class having the highest cosine correlation. Creating a word weight vector for each of a set of words in the plurality of score category essays, comprises calculating the word weight vector using the following equation:

$$w_{i,s} = (\text{freq}_{i,s}/\text{max\_freq}_s) * \log(n\_\text{essays}_{total}/n\_\text{essays}_i)$$

wherein, $n\_\text{essays}_{total}$ is the total number of training essays, and $n\_\text{essays}_i$ is the number of essays containing $w_{i,s}$ and wherein $\text{freq}_{i,s}$ is the frequency of argument word "i" in score class "s," $\text{max\_freq}_s$ is the frequency of the most frequent argument word in score class "s".

In an embodiment, an adaptive cutoff algorithm may be used to more accurately "round" raw scores in score categories by more accurately modeling human scoring. A sample of human graded human essays do not always fall into categories that have equally spaced cutoff points. Such an adaptive cutoff algorithm may include the steps of: (1) collecting raw scored essays across all score categories, wherein the raw scored essays are graded by steps (a) through (c) as explained above and by human graders; (2) determining an appropriate cutoff value set by maximizing an overall exact agreement to human graders and a minimum lowest exact agreement to human graders in a score category; (3) comparing the raw score generated by steps (a) through (c) as discussed above to the selected cutoff set to obtain a score for the essay.

The present invention includes a system for automatically grading an essay, the essay being responsive to a test prompt, comprising: a memory device; and a processor, wherein said processor is operable to execute instructions for performing the methods described herein for grading an essay.

The present invention includes novel model building methods comprising the steps of: (1) compiling human graded essays across a range of score categories, wherein the essays are written in response to more than one essay prompt question; (2) evaluating the human graded essays to generate a set of features; (3) using the score category for each graded essay, the feature set for each graded essay and a multiple regression equation to produce weights for each feature; and (4) using the weights to create a model for evaluating any essay.

In this model building approach, the feature set may comprise 12 predetermined features. The feature set may comprise features that are independent of test prompt, dependent on the test prompt, and combinations thereof. In modeling building, a standardized model may be created in which to evaluate an essay over a predetermined set of features. For example, an essay may be determined wherein the essay length accounts for 10% of the score, the essay vocabulary accounts for 12% of the score, and the essay grammar accounts for 5% of the score. Therefore a single set of weights may be determined to be best representative of human grading across all essay prompts.

In embodiments, comparison of training essays to human graded essays in order to generate a model or a scoring equation may comprise several steps. To generate the model, a multiple regression analysis to predict human scores may be used. The first k features may have optimized weights and the last n-k features may have fixed predetermined weights. Creating the model may include: (1) applying a suitable linear transformation to the features that have negative correlations with the human score in order to have only positive regression weights; (2) standardizing all features and the predicted human score; (3) applying a linear multiple regression procedure to predict a standardized human score from a first k standardized features and obtaining k standardized weights for the first k features (labeled $s_1$-$s_k$); (4) expressing fixed standardized weights of the last n-k features as percentages of the sum of standardized weights for all features; (5) finding the fixed standardized weights by applying the following formula to the last n-k features:

$$s_i = \left[ p_i * \sum_{j=1}^{k} s_j \right] \bigg/ \left[ 1 - \sum_{j=k+1}^{n} p_j \right];$$

($k+1 \leq i \leq n$); (6) finding a set of un-standardized weights (labeled $w_1$-$w_n$), by multiplying $s_i$ by the ratio of standard deviation for human score to standard deviation for the feature; (7) computing an interim predicted score as the sum of the product of feature values and weights $w_1$-$w_n$; (8) regressing the interim predicted score to the human score to obtain an intercept, a, and a weight, b; and (9) computing the final un-standardized weights as: $f_i = a*w_i$; ($1 \leq i \leq n$). In forming a model, wherein the features are weighted to represent an overall score for an essay, the weights may be any non-negative value.

BRIEF DESCRIPTION OF THE DRAWING

The present invention will be better understood, and its numerous objects and advantages will become more apparent, by reference to the following detailed description of the invention when taken in conjunction with the following drawing, of which.

DETAILED DESCRIPTION OF THE INVENTION

Before the present methods are described, it is to be understood that this invention is not limited to the particular methodologies or protocols described, as these may vary. It is also to be understood that the terminology used herein is for the purpose of describing particular embodiments, and is not intended to limit the scope of the present invention which will be limited only by the appended claims.

It must be noted that as used herein and in the appended claims, the singular forms "a", "an", and "the" include plural reference unless the context clearly dictates otherwise. Thus, for example, reference to a "computer" is a reference to one or more computers and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

The present invention comprises a computer-based system to automatically score essay responses. Solely for illustrative purposes, the following description of the invention focuses on the standardized GMAT Analytical Writing Assessments: (a) Analysis of an Argument (Argument essays) and (b) Analysis of an Issue (Issue essays) item types. However, the present invention is not limited to use as in the illustrated examples, but may be used in evaluating any non-objective response to a test prompt.

Figure 1:
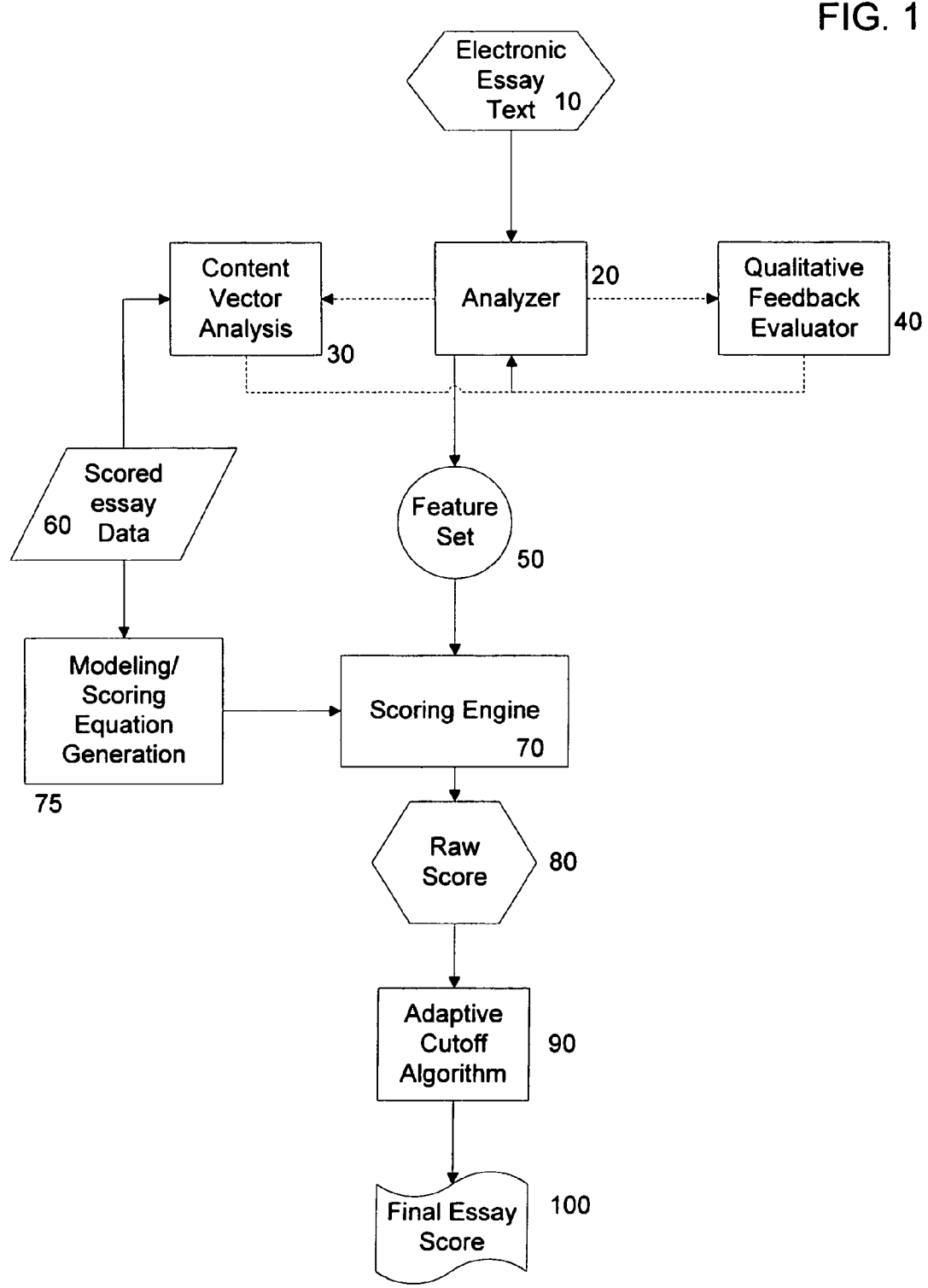
FIG. 1 is a diagram of the functional steps of the present invention.

The automated essay grading of the present invention is shown in FIG. 1. Each original electronic essay text 10 may be analyzed 20 to derive a feature set representative of the essay text. In analyzing the text, content vector analysis 30 may be performed, wherein scored essay data 60 may be used in order to evaluate the word content of the essay being graded. Automated evaluation 40 may be performed on the text 30 to generate qualitative feedback, such as information regarding the grammar, style and organization of the essay. The feature set 50 derived from the analysis may then be scored in the scoring engine 70. Modeling 75 may be performed with scored essay data 60 in order to generate a scoring equation, wherein the feature weights are determined by regression analysis. This scoring equation with the weighted feature values may then be used to score 70 the feature set. The scoring equation may also be referred to as a "model." The modeling step 75 may use the scored essay data 60, and a multiple regression equation to generate parameter estimates (weights) for the scoring equation.

Score essay data 60 is a batch of original electronic essay text responses (essays already having a known score) and is used in modeling 75. This data 60 may be prompt specific data or generic data. The modeling step 75 will extract either prompt specific or generic data from the scored essay data 60 according to the selected modeling approach. The features extracted from each essay 50 are provided to the scoring engine 70 to assess the raw score for the essay 80. The raw score 80 may be processed by the adaptive cutoff algorithm 90 to generate a final scored essay 100.

The present invention automatically analyzes several features of an essay and scores the essay based on the features of the essay as specified in given scoring rubrics. For example, with respect to the Standardized GMAT Exam, descriptions of essay quality or writing competency at each score level of a 6-point scoring guide are used.

The present system automatically grades essays using features that reflect the same scoring rubrics used by human raters to assign scores to essay responses. Although, the use of any scoring rubrics or guidelines is within the scope of the present invention, this disclosure will describe as an embodiment the 6-point holistic rubrics to describe the present invention.

The present invention uses a hybrid feature methodology. It incorporates several variables that are derived statistically, or extracted through Natural Language Processing (NLP) techniques. In the present scoring methods and systems, a predetermined feature set is extracted from all essays, a unique modeling approach is set forth, and a final score assignment algorithm, wherein essays are categorized into score levels are described. In the present scoring methods and systems, there are several known text analyzers that are used to evaluate a text for at least syntactic, rhetoric and organizational features.

For text evaluation, the present system and methods analysis a fixed set of features, preferably 12 features. In modeling, a multiple regression analysis includes a combination of predetermined (or fixed) and optimal regression weights to be determined for the 12 features. Therefore, weights may be determined for the each of the features of the feature set, across all score categories.

Feature Set.

The feature set may comprise the following 12 features: (1) length of the essay in total number of words, (2) percent of grammar errors with regard to total number of words, (3) percent of usage errors with regard to total number of words, (4) percent of mechanics errors with regard to total number of words, (5) percent of style feedback comments with regard to total number of words, (6) optimal number of discourse elements, wherein discourse elements are selected from the group comprising background sentences, thesis sentences, main idea sentences, supporting idea sentences and conclusion sentences, (7) average word length of discourse elements, (8) score category to which the essay text is most similar with regard to vocabulary usage, (9) similarity of the essay vocabulary to the vocabulary used in essays scored in the highest score category, (10) ratio of number of words types to tokens in the essay, (11) vocabulary level, and (12) average word length. These 12 features have consistently strong correlations to human reader scores across testing programs and score categories.

The twelve features may be categorized into several categories that present an overall evaluation of an essay. First, essay length may be a feature. Features related to grammar, usage, mechanics, and style may be generated using a qualitative feedback program. The grammar, usage, mechanics, and style features may be referred to as "error feedback features." Two features related to organization and development may be generated. Additionally, three features may be generated to reflect the lexical complexity of the essay. A content vector analysis may be performed to evaluate the prompt-specific vocabulary usage features of the essay.

Length of Essay.

The length of the essay in total number of words (feature 1) may be determined and used to evaluate the essay. Although correlations between human essay score and essay length are strong, the use of essay length as a factor in automatic essay scoring systems may be problematic. By explicitly including the essay length as a feature, its weight in determining a final score may be controlled. As with any of the features, its weight may be maximized, minimized or set to zero if desired. In this manner, the present essay grading systems and methods seek to minimize the problems associated with using essay length in automatic essay scoring systems while simultaneously realizing the benefit of the strong correlation between an essay score assigned by a human scorer and essay length.

In an embodiment of the feature set, 11 of the 12 preferably fixed features reflect essential characteristics in essay writing, and are explicitly defined such that they will be independent of essay length. These 11 features identify characteristics in student essay writing that are associated with errors in grammar, usage, and mechanics, comments about style, organization and development, and vocabulary usage. About half of these features are directly tied to qualitative feedback.

Error Feedback Features.

Qualitative feedback features may be determined such as: the percent of grammar errors with regard to total number of words (feature 2); the percent of usage errors with regard to total number of words (feature 3); the percent of mechanics errors with regard to total number of words (feature 4); and the percent of style feedback comments with regard to total number of words (feature 5).

Qualitative feedback may be generated from human scorers or automatically such as through the use of computerized writing analysis tools. One suitable writing analysis tool is Criterion$^{SM}$ Online Essay Evaluation Service, a writing instruction application developed by Educational Testing Service, Princeton, N.J. Criterion$^{SM}$ Online Essay Evaluation Service is described in Burstein, J., Chodorow, M. and Leacock, C. (2003), "Criterion$^{SM}$ Online essay evaluation: An application for automated evaluation of student essays," presented at the Fifteenth Annual Conference on Innovative Applications of Artificial Intelligence, Acapulco, Mexico, August 2003, herein incorporated by reference in its entirety. Other methods of essay evaluation may also be employed and are known in the art.

Qualitative feedback regarding grammar, usage, and mechanics, and comments about style are used to generate four (4) features utilized by the essay scoring methods and systems. For example, Criterion$^{SM}$, identifies a total of about 33 errors, most of which are identified using natural language processing. These grammar, usage, mechanics and style features include information, such as errors in subject-verb agreement, homophone errors, misspelling, and overuse of vocabulary approaches.

The following four features may be derived from the qualitative feedback:

Percent of grammar errors with regard to total number of words (Total Number of Grammar Errors÷Total Words).

Percent of usage errors with regard to total number of words (Total Number of Usage Errors÷Total Words).

Percent of mechanics errors with regard to total number of words (Total Number of Mechanics Errors÷Total Words).

Percent of style feedback comments with regard to total number of words (Total Number of Style Comments÷Total Words).

Organization and Development Features.

The organizational and development features may be determined either by human graders according to scoring guidelines or automatically using an automatic writing analysis tool. Two features may be part of the extracted feature set: the optimal number of discourse elements (feature 6), wherein discourse elements are selected from the group comprising background sentences, thesis sentences, main idea sentences, supporting idea sentences and conclusion sentences; and the average word length of the discourse elements (feature 7).

For example, the Criterion$^{SM}$ feedback application automatically identifies sentences in the essay that correspond to the following essay discourse categories, using natural language processing methods known in the art: Background, Thesis, Main Ideas, Supporting Ideas and Conclusion. Preferably, two features are derived from this feedback information: optimal number of discourse elements and average word length of the discourse elements.

With respect to the number of discourse elements, conventional methods suggest that optimally there are 8 optimal discourse element units in an essay: 1 Thesis statement, 3

Main Points, 3 Supporting Idea segments (corresponding to each Main Point), and 1 Conclusion. However, the number of optimal discourse elements may be configurable. This feature indicates whether the essay has the optimal or fewer than the optimal number of discourse elements. For instance, an essay with six units is missing two units from the optimal number 8, whereas an essay with eight or more units has the optimal number of units. This value is preferably represented as follows, although other methods may be used. An essay that has 8 optimal discourse units is assigned a value of '0.' Higher values are not assigned if more than the 8 expected units are identified. If it has only 5 units, it receives a value of "−3."

To calculate the average word length of discourse elements, once the discourse elements are identified, the total number of identified discourse elements (D) and the total number of words (W) in the essay are counted. The average word length of the discourse elements is then the total words divided by the number of discourse elements, or W÷D. For example, if there are 8 discourse elements in an essay, and the essay is 240 words long, then the average length of each discourse unit is 240÷8, or 30 words.

Content or Vocabulary Features.

Content Features may be determined such as: the score category to which the essay text is most similar with regard to vocabulary usage (feature 8); and the similarity of the essay vocabulary to the vocabulary used in essays scored in the highest score category (feature 9). Vocabulary usage (topical analysis) features may be calculated in a particular essay by comparing the word usage of the essay to the word usage of previously graded essays across the different score categories. In order to generate vocabulary based features of an essay, content vector analysis may be employed.

Content vector (CV) analysis is a statistical weighting technique used to identify relationships between words and documents. With regard to the approximate specifications in the rubric about essay content, CV analysis can be used to identify vocabulary (or content words) in essays that appear to contribute to essay score.

For example, assigning one of six scores to a GMAT essay is a standard type of classification problem. Statistical approaches to classification define each class (score) by the distribution of characteristics found in training essay data (graded essays used for comparison). Then, each test essay is analyzed, and its distribution is compared to that of the known categories. The category which best matches the test essay is selected.

Standard CV analysis characterizes each text document (essay) at the lexical (word) level. The document is transformed into a list of word-frequency pairs, where frequency is simply the number of times that the word appeared in the document. This list constitutes a vector which represents the lexical content of the document with the possible exception of pre-selected function words which are removed prior to vector construction. Morphological analysis can optionally be used to combine the counts of inflectionally-related forms so that "walks," "walked," and "walking" all contribute to the frequency of their stem, "walk." In this way, a degree of generalization is realized across morphological variants. To represent a whole class of documents, such as a score level for a set of essays, the documents in the class are concatenated and a single vector is generated to represent the class. Optionally, some function words are removed prior to vector construction.

CV analysis refines this basic approach by assigning a weight to each word in the vector based on the word's salience. Salience is determined by the relative frequency of the word in the document (or class) and by the inverse of its frequency over all documents. For example, "the" may be very frequent in a given document, but its salience will be low because it appears in all documents. If the word "pterodactyl" appears even a few times in a document, it will likely have high salience because there are relatively few documents that contain this word.

With this understanding, the word frequency vectors for the individual essays and for each score category are then converted into vectors of word weights. The weight for word i in score category s is:

$$w_{i,s} = (\text{freq}_{i,s}/\text{max\_freq}_s) * \log(n\_\text{essays}_{total}/n\_\text{essays}_i);$$

wherein, $n\_\text{essays}_{total}$ is the total number of training essays, and $n\_\text{essays}_i$ is the number of essays containing $w_{i,s}$, and wherein $\text{freq}_{i,s}$ is the frequency of argument word "i" in score class "s," and $\text{max\_freq}_s$ is the frequency of the most frequent argument word in score class "s".

Two content analysis features may be computed from these cosine correlations, providing a measure for the level of prompt-specific vocabulary used in the essay, as described below.

The score point value (for example, 1 to 6) for which the maximum cosine correlation over the six score point correlations was obtained. This feature indicates the score point level to which the essay text is most similar with regard to vocabulary usage.

The cosine correlation value between the essay vocabulary and the sample essays at the highest score point (for example, 6). This feature indicates how similar the essay vocabulary is to the vocabulary of the best essays.

Lexical Complexity Features.

Word-based features may be determined as part of the feature set representative of an essay to be graded. Such word-based features may include: the ratio of number of words types to tokens in an essay (feature 10); the vocabulary level of the essay; and the average word length of the essay (feature 12). The ratio of number of word types to tokens in an essay feature indicates repetitive word use in an essay. The larger the type/token ratio, the less repetitive word use occurs in the essay. For example, in the following sentence there are 5 word types (this, essay, is, a, and long), and 8 tokens (this, essay, is, a, long, long, long, essay). So the type/token ratio is 6÷8, or 0.75.

This essay is a long, long, long essay.

In the next sentence, there are 4 types (this, essay, is, long) and 4 tokens (this, essay, is, long), and the type/token ratio is 1.

This essay is long.

A word frequency index may be used to obtain a measure of vocabulary level. Vocabulary in this sense, refers to the writer's availability to diversify the individual words of her essay. The content features described above also measure "vocabulary" in a sence. With respect to vocabulary in the content section, the assumption is that essays within the same score category should have similar word usage and choice.

One suitable word frequency index is described in Breland, H. M., Jones, R. J., & Jenkins, L. (1994), The College Board vocabulary study (ETS Research Report NO. 94-26), Princeton, N.J.: Educational Testing Service, herein incorporated by reference in its entirety. Other suitable word frequency indices or another measure may be used to determine the vocabulary level feature of an essay. Using the vocabulary index, all of the words in the essay are assigned a frequency value. The value for the word with the fifth lowest value is used as the vocabulary level feature. The vocabulary index assumes that a word in this range indicates a more rare or sophisticated word.

The average word length in characters is computed across all words in the essay as another feature. As the final fixed feature of the present invention, the total number of letters per word in the essay is computed.

The method of grading an essay using an automated essay scoring system of the present invention may also be adapted to use other features known in the art.

Model Building.

Another aspect of the present invention is the use of a fixed feature set or preferably, the set of 12 features described above to build a model or a scoring equation, which may be used to grade an essay. Modeling uses regression analysis to build a weighted value for each score feature. The scoring equation uses the weights of each feature and uses the feature set generated for the essay to be graded and computes a raw score for the essay. Modeling engines and systems attempt to assign a weight each of the features of an essay. The combination of all the weighted features of the essay thus determines the score category of the essay. Because the number of features is small and each one of them significantly contributes to the goal of the score that would be assigned by a human grader, it is possible to use a multiple regression approach for modeling whereby a fixed feature set is present in all models.

Alternatively to using multiple regression to determine the weights of the features of the present invention to generate a raw score, the weights may be predetermined. Since the features in the models are known, it is possible to specify the weight of some or all features in advance, instead of using multiple regression analysis to find optimal weights. Predetermined weights may optionally be set to zero. In one embodiment of the present invention, the weights for the prompt-specific vocabulary (content) usage features are set to zero, thus effectively excluding these features in model building. Setting some feature weights to zero, such as the content-dependent or prompt-specific vocabulary features, is analogous to discarding these features from the feature set. This ability to control the feature weights is important in determining the theoretical considerations related to various components of writing ability.

Regression analysis is used to generate a predictive scoring equation or a model, wherein the weighted values of the n features of the feature set are determined. The regression analysis weights the n features of which the first k will have optimized weights and the last n-k will have fixed predetermined weights. The steps of the regression method are as follows:

1. Apply a suitable linear transformation to the features that have negative correlations with the human score in order to have only positive regression weights.

2. Standardize all features and the predicted human score.

3. Apply a linear multiple regression procedure to predict the standardized human score from the first k standardized features and obtain k standardized weights for these features (labeled $s_1$-$s_k$).

4. The fixed standardized weights of the last n-k features should be expressed as percentages of the sum of standardized weights for all features (labeled $p_{k+1}$-$p_n$). For example, if there are two fixed weights in a set of 12 features then $p_{11}$ and $p_{12}$ could be 0.1 and 0.2, respectively, which means that $s_{11}$ will be equal to 10% of the sum of $s_1$-$s_{12}$, $s_{12}$ will be equal to 20% of $s_1$-$s_{12}$, and the sum of $s_1$-$s_{10}$ will account for the remaining 70% of the standardized weights.

5. Find the fixed standardized weights by applying the following formula to the last n-k features:

$$s_i = \left[ p_i * \sum_{j=1}^{k} s_j \right] / \left[ 1 - \sum_{j=k+1}^{n} p_j \right]; (k+1 <= i <= n);$$

6. To find the un-standardized weights (labeled $w_1$-$w_n$), multiply $s_i$ by the ratio of the standard deviation for human score to standard deviation for the feature.

7. Compute an interim predicted score as the sum of the product of feature values and weights $w_1$-$w_n$.

8. Regress the interim predicted score to the human score and obtain an intercept, a, and a weight, b. The intercept will be used as the final intercept 9. Compute the final un-standardized weights as:

$$f_i = a * w_i (1 <= i <= n)$$

Previously described essay grading systems and methods have used models are that prompt-specific. That is, models are built specifically for each topic or question, using human-reader-scored essay data written only to a particular topic or question. This requires significant data collection and human reader scoring, both of which may be time-consuming and costly efforts. In an embodiment of the present invention, a generic model, which may be used across all essay prompts is described. Generic or semi-generic models may reduce data collection. Generic models have the following advantages: a) they can be applied across multiple prompts, b) they require less data collection over time, and c) the models are standardized, meaning that every essay will be graded using the same weights as applied to each feature, whether the essay is written about the Civil War or about modern ballet.

Semi-generic models may be used to score an essay. Several features are extracted from the essay text that are prompt independent such as the qualitative feedback features described above. The text is also evaluated for content, such as through the use of cosine evaluations to determine prompt specific features relating to word use. For example, an essay on the Civil War should include specific words such as Gettysburg, Abraham Lincoln, and slavery. Therefore pre-graded essay data may be used to compile features of the essay text. However, in comparing the derived vector of essay features to previously evaluated essays, in order to generate a raw score, the previously evaluated essays or training data are written in response to various test prompts.

Three embodiments of modeling may be used in essay grading. Conventionally, methods of grading an essay using an automated essay scoring system, have used a prompt-specific modeling approach in which a new model is built for each topic. A feature set of the essay to be graded is thus compared to the feature sets of training data written specifically to the essay prompt. Such a prompt specific model can be used in the present invention. Additionally, generic model building may be used, wherein no features are derived that relate to the specific essay prompt. For the GMAT example, fully generic modeling means that there is one argument model to score all argument topics, and one issue model to score all issue topics.

The essay scoring system may include a multiple regression program that generates parameter estimates (weights) for a model feature set. The weight features in the model are predictive of a range of scores for essays that respond to the test prompt. The features extracted from each essay to be graded are provided to the scoring engine for use in assessing the raw score for the essay. In alternative embodiments, the multiple regression program may used to create three types of models: (1) models based on data that is fully prompt specific, (2) models based on data that is fully independent from the test prompt; or (3) models based on both prompt specific and generic data.

Data collection of graded essays to build models is generally known. For example, sixth through twelfth grade Criterion$^{SM}$ user data, and GMAT and TOEFL® (Test of English as Foreign Language) human-scored essay data may be used to build models. Sixth through twelfth grade essays may be extracted from the Criterion$^{SM}$ database and scored by trained human readers according to grade-specific rubrics to be used in the modeling steps. The GMAT and TOEFL data may also include similar scoring by humans.

The generic models are relatively reliable as compared to prompt-specific models because the fixed feature set of the present invention measures topic-independent aspects of writing ability. For example, if eight discourse units in an essay are interpreted as evidence of good writing ability than this interpretation should not vary across different test prompts. The same is true with rates of grammar, usage, mechanics, and style errors: the interpretation of 0%, 1%, or 5% error rates as evidence of writing quality should stay the same across different test prompts. Once a generic model is prepared for a program, it is possible to use the model to score essay written on new topics, immediately, without additional data collection for most features.

In the final embodiment, the predictive feature set contains some features that are evaluated using semi-generic modeling. For example, the two vocabulary usage features are compared to prompt-specific data from all score points. The actual reduction in training sample sizes is dependent on the number and distribution of essays needed to evaluate the two vocabulary usage features.

Known systems of modeling use the minimum number of 265 essays, with 15, 50, 50, 50, 50, and 50 essays in each of the score points 1-6, respectively. Since the required flat distribution of essays is presumably different from the field distribution of essays, the effective sample size for training the vocabulary usage features may be higher. The effective sample size for training the vocabulary usage features is defined as the number of essays that need to be collected before the expected distribution of essays may be achieved. The effective sample size may be computed as:

N*Maximum of $(E_i/O_i)$ over all score points i

Where N is the minimum sample size required, $E_i$ is the expected relative frequency (in percents) of score point i, and $O_i$ is the observed relative frequency (in percents) of score point i.

The effective sample size tends to go up rapidly when infrequent score categories are expected more than is observed in the field distribution. For example, the relative frequency of score point 1 is about 6% (and the relative frequency of the other score categories is about 19%). If the observed relative frequency of score point one is only 3% the ratio of expected to observed relative frequency for this category will be two and the effective sample size for training the vocabulary usage features will be twice the minimum sample size.

Adaptive Cutoff Algorithm.

The present grading systems and methods may use an algorithm to round raw scores into an appropriate score category. The cutoffs used to round the continuous e-rater score may be adapted according to the machine and human score distributions of a particular data set. In contrast to the adaptive cutoff, simple rounding of scores uses half-point cutoffs.

Once the features are extracted from the text and comparison has been completed using a model, the raw score of a graded essay may be processed into a score category. Preferably, the raw score is rounded from the continuous regression model score to the six scoring guide categories. Known systems of grading an essay use a cutoff value of simply the half points between whole values. For example, an essay receiving an e-rater score in the range of 3.5 to 4.4 would be assigned a final score of 4. However, this method of rounding may not be optimal with respect to the goal of simulating a human grader score. The present grading method uses different "natural" sets of cutoffs. The factors that influence the values of the best cutoffs are, among others, the distributions of the features used in modeling and the distribution of human scores.

To find a suitable set of cutoffs for a system, the algorithm searches through all sets of cutoffs (by tenths or by one-hundredths, for example) to find those that maximize overall (average across the 6 grade levels) exact agreement and minimum exact agreement across all score categories. These two criteria are weighted to produce ratings of sets of cutoffs. This search process is performed on pooled data across a number of prompts to produce an appropriate set of cutoffs for a program. In the case of GMAT, cutoffs for the argument model and the issue model are configured separately, using essay data from respective prompt types. The weights produce the ratings of sets and can be maximized to match the human graders.

An example of how the cutoffs are determined is as follows. Each set of cutoffs is assigned a score which is computed as 80% of the overall exact agreement for that set of cutoffs and 20% of the minimum exact agreement across all score points. The set of cutoffs with the highest score is selected for use. For example, given a specific set of cutoffs with these exact agreement (to human graders) values:0.30, 0.35, 0.40, 0.50, 0.45, and 0.40 for the six score points, the overall exact agreement value is 0.40. (the average of the exact agreement values). The rating assigned to this set would be 20% of 0.30 (the minimum exact agreement achieved for score 1) plus 80% of 0.40 (the overall exact agreement), or 0.38.

Figure 2:
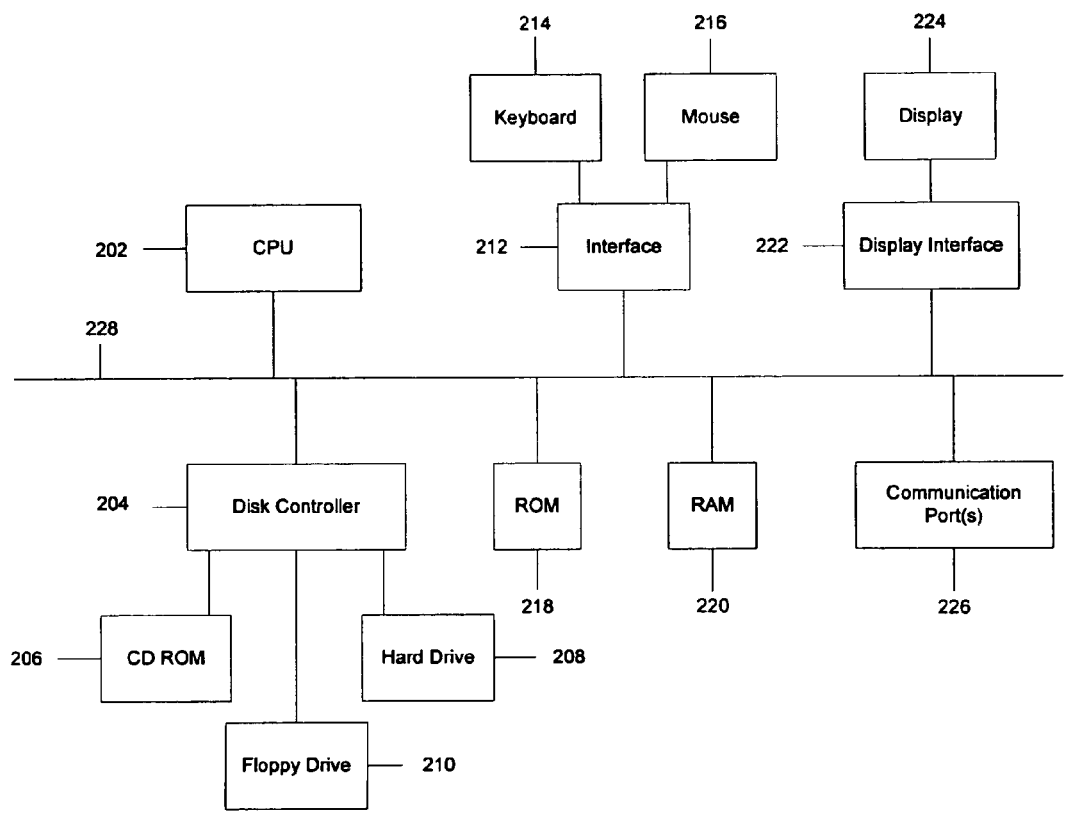
FIG. 2 is an exemplary computer system for grading essays according to an embodiment of the present invention.

FIG. 2 is a diagram of an exemplary system of the present invention. Referring to FIG. 2, a bus 228 serves as the main information highway interconnecting the other illustrated components of the hardware. CPU 202 is the central processing unit of the system, performing calculations and logic operations required to execute a program. Read only memory (ROM) 218 and random access memory (RAM) 220 constitute exemplary memory devices.

A disk controller 204 interfaces with one or more optional disk drives to the system bus 228. These disk drives may be external or internal floppy disk drives such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

A display interface 222 may permit information from the bus 228 to be displayed on the display 224 in audio, graphic or alphanumeric format. Communication with external devices may occur using various communication ports 226. An exemplary communication port 226 may be attached to a communications network, such as the Internet or an intranet. A plurality of user computers may be attached to the communication port 226 via the communications network.

In addition to the standard computer-type components, the hardware may also include an interface 212 that allows for receipt of data from input devices such as a keyboard 314 or other input device 316 such as a remote control, pointer and/or joystick.

EXAMPLES

A general description of the human score distribution is described in Table 1. Statistics representing the accuracy in determining features using an automatic grading method is described in Table 2. In Table 3, the relation between human and automated grading is compared. Variations on the weight of the essay length is described in Table 4. Comparison of an automated method with human scoring is detailed in Table 5. Table 6 shows the relationship between scoring evaluated by a current automated method versus a known prior art automated method.

Descriptive Statistics

The data set included between 480 and 494 essays per prompt in a distribution that is representative of field distributions across scoring categories. This data set was used for both training and cross-validation of regression models. A different set of essays was used to train the vocabulary usage features. In other words an essay may be evaluated against previously graded essays for vocabulary features only. The essay may be evaluated for the remaining features using programs which extract certain information of the text, from the text itself, such as grammar usage.

Table 1 gives the relative distribution of human resolved scores (HRS) for the two programs, Argument and Issue. One can see that the HRS distribution is very similar for the two programs. "Issue" designates that the essay is written on a particular subject matter and is very content-based. Meaning that an essay written describing a particular historical figure will have specific facts and specific words which relate to the figure and her accomplishments. "Argument" designates that the essay is written in response to a particular question in which the student is asked to write a persuasive essay explaining his view on a particular subject. Such an essay may be evaluated more on its face for organization and/or development than in reference to a specific check list of facts to mention. This means that in grading for essay content (Issue) or for organization/development (Argument), human graders are able to distinguish across voluminous essays in order to characterize them into a one of six categories of skill level. The human graders thus are capable of distributing the essays across these categories whether they are grading based on content or based on prompt-independent criteria (organization/development).

TABLE 1

Number of Essays (N) and Mean, Standard Deviation (STD), and Relative Distribution of Human Resolved Score for 7 Argument Prompts and 9 Issue Prompts

| Prompt-Type | N | Mean | STD | Score Point 1 | 2 | 3 | 4 | 5 | 6 |
|---|---|---|---|---|---|---|---|---|---|
| Argument | 3449 | 3.76 | 1.23 | 4% | 12% | 25% | 31% | 20% | 8% |
| Issue | 4409 | 3.78 | 1.22 | 3% | 12% | 25% | 31% | 20% | 8% |

Table 2 presents the correlations of the features used in an automated grading program with HRS and their means and standard deviations for each program. The present data reflects that human grading may be simulated across all feature sets using the various text analyzers as described herein.

TABLE 2

Correlations with HRS, Mean Feature Value, and Standard Deviations for the V.2.0 Feature Set

| Feature From Section 2.1 | Argument Prompts | | | Issue Prompts | | |
|---|---|---|---|---|---|---|
| | Correlation with HRS | Mean Feature Value | STD | Correlation with HRS | Mean Feature Value | STD |
| 1. Grammar | −0.28 | 0.00 | 0.01 | −0.28 | 0.00 | 0.01 |
| 2. Usage | −0.15 | 0.00 | 0.00 | −0.13 | 0.00 | 0.00 |
| 3. Mechanics | −0.36 | 0.02 | 0.02 | −0.39 | 0.02 | 0.02 |
| 4. Style | −0.39 | 0.05 | 0.05 | −0.43 | 0.05 | 0.05 |
| 5. Optimal Discourse Units | 0.51 | −1.97 | 2.03 | 0.56 | −2.03 | 1.97 |
| 6. Discourse Unit Length | 0.06 | 47.39 | 22.73 | 0.13 | 47.64 | 22.17 |
| 7. Max Score Point | 0.48 | 4.46 | 1.42 | 0.44 | 4.47 | 1.39 |
| 8. Cosine Value 6 | 0.65 | 0.21 | 0.06 | 0.66 | 0.18 | 0.05 |
| 9. Type/Token | −0.42 | 0.65 | 0.09 | −0.34 | 0.66 | 0.09 |
| 10. Word Frequency | −0.36 | 39.47 | 6.78 | −0.47 | 40.87 | 6.45 |
| 11. Word Length | 0.20 | 4.76 | 0.27 | 0.13 | 4.85 | 0.32 |
| 12. Essay Length | 0.69 | 272.28 | 102.23 | 0.77 | 273.90 | 107.66 |

Table Description: HRS=Human Resolved Score

Most features have medium-size correlations of a magnitude of 0.30 and higher, and essay length shows a very high correlation of almost 0.8. All correlations are also in the expected direction. For instance, the negative correlations for features related to Grammar, Usage, Mechanics, and Style error rates (more errors indicate lower scores), the Word Frequency feature (a smaller word frequency index signifies a less common word), and the Type/Token Ratio (indication of essay brevity). On the other hand, positive correlations are observed for the vocabulary usage features, Max Score Point and Cosine Value 6, where larger cosine values indicate higher scores. The results are very similar for the two prompt types (Issue and Argument).

Table 3 presents the mean feature values or weights based on human resolved score across the two prompt types: Argument and Issue. In other words a human grader would find less grammar errors in a score "6" category than in a score "1" category ("0.002" to "0.010"). Also, a human grander would find that a score "6" category essay would have most of the discourse elements present (topic sentences, development sentences, etc.), as represented by the value "−0.5" (only missing about ½ of a discourse elements. A human grader would find that a score "1" is missing about "5.1" discourse elements. These features and their respective "weights" may thus be modeled by an automated system.

TABLE 3

Mean Feature Values for the V.2.0 Feature Set by HRS

| Features From Section 2.1 | HRS 1 | 2 | 3 | 4 | 5 | 6 |
|---|---|---|---|---|---|---|
| 1. Grammar | 0.010 | 0.007 | 0.005 | 0.003 | 0.003 | 0.002 |
| 2. Usage | 0.003 | 0.003 | 0.002 | 0.002 | 0.001 | 0.001 |
| 3. Mechanics | 0.056 | 0.036 | 0.027 | 0.019 | 0.015 | 0.012 |
| 4. Style | 0.134 | 0.087 | 0.060 | 0.046 | 0.033 | 0.020 |
| 5. Optimal Discourse Units | −5.1 | −3.7 | −2.6 | −1.7 | −0.9 | −0.5 |
| 6. Discourse Unit Length | 39.5 | 46.6 | 46.2 | 47.3 | 48.8 | 54.3 |
| 7. Max Score Point | 3.2 | 3.4 | 4.0 | 4.7 | 5.1 | 5.4 |
| 8. Cosine Value 6 | 0.10 | 0.14 | 0.17 | 0.20 | 0.23 | 0.25 |
| 9. Type/Token | 0.77 | 0.70 | 0.67 | 0.65 | 0.62 | 0.60 |
| 10. Word Frequency | 48.2 | 44.1 | 41.7 | 39.8 | 37.4 | 35.7 |
| 11. Word Length | 4.72 | 4.72 | 4.78 | 4.83 | 4.85 | 4.89 |
| 12. Essay Length | 104 | 176 | 224 | 278 | 347 | 443 |

Table Description: HRS=Human Resolved Score

Table 4 presents the average Kappa (comparison of automated grade vs. human grade), over all prompts, obtained from an automated system with different predetermined weights for essay length. The models tested were prompt-specific (E20S), generic models with prompt-specific vocabulary usage features (E20Gvu), and fully generic models (E20G). The weights are expressed as percents of total standardized weights for all features in model. Because of its high correlation with human score, the effect of running a free regression model with essay length as one of the features is to assign a large weight to this feature. On the other hand, building an optimal model from all other features and adding essay length with a predetermined weight has a very small effect on performance. In the case of the argument prompts there is a significant increase in Kappas when the essay length weight is increased from 0.0 to 0.1 and smaller increases up to when the weight is in the range 0.3 to 0.4. For the issue prompts, we find a noticeable increase from 0.0 to 0.1 and a smaller increase from 0.1 to 0.2. In the case of the argument prompts, we see a decrease in performance when the essay length weight is raised to 0.5 from 0.4. The table also shows very similar results between the generic models, in particular the E20G (generic) model, and prompt-specific models with a slight advantage to the generic models.

TABLE 4

Average Kappas for Automated System

| System | Program | Predetermined Essay Length Weight | | | | | |
|---|---|---|---|---|---|---|---|
| | | 0 | 0.1 | 0.2 | 0.3 | 0.4 | 0.5 |
| E20G | Argument | 0.32 | 0.34 | 0.35 | 0.35 | 0.36 | 0.35 |
| | Issue | 0.38 | 0.41 | 0.42 | 0.42 | 0.42 | 0.42 |
| E20Gvu | Argument | 0.34 | 0.37 | 0.38 | 0.39 | 0.39 | 0.38 |
| | Issue | 0.42 | 0.44 | 0.46 | 0.44 | 0.44 | 0.44 |
| E20S | Argument | 0.34 | 0.37 | 0.38 | 0.38 | 0.39 | 0.39 |
| | Issue | 0.41 | 0.44 | 0.44 | 0.44 | 0.44 | 0.43 |

To give a sense of the relative importance of the different features in the regression models Table 5 presents the average weights obtained for an automated system with 0.2 predetermined weight for essay length.

TABLE 5

Correlations with HRS, Means, and Standard Deviations for the V.2.0 Feature Set

| Features From Section 2.1.1 | Argument Prompts | | Issue Prompts | |
|---|---|---|---|---|
| | Mean | STD | Mean | STD |
| 1. Grammar | 0.04 | 0.002 | 0.03 | 0.003 |
| 2. Usage | 0.01 | 0.004 | 0.01 | 0.002 |
| 3. Mechanics | 0.03 | 0.003 | 0.05 | 0.003 |
| 4. Style | 0.03 | 0.003 | 0.04 | 0.002 |
| 5. Optimal Discourse Units | 0.23 | 0.006 | 0.22 | 0.003 |
| 6. Discourse Unit Length | 0.14 | 0.002 | 0.14 | 0.002 |
| 7. Max Score Point | 0.10 | 0.004 | 0.06 | 0.003 |
| 8. Cosine Value 6 | 0.13 | 0.006 | 0.10 | 0.004 |
| 9. Type/Token | 0.02 | 0.004 | 0.04 | 0.003 |
| 10. Word Frequency | 0.04 | 0.004 | 0.05 | 0.002 |
| 11. Word Length | 0.03 | 0.006 | 0.05 | 0.002 |
| 12. Essay Length | 0.20 | 0.000 | 0.20 | 0.000 |

The weights for the 12 features are similar for both the Issue and Argument essays. This indicates that a single model may be created to grade both the Issue and Argument essays, event though one type of essay may be more content based (Issue) and one type of essay appears to be more organizational and development based (Argument).

Notice that the weight for essay length was predetermined at 0.2. Also, since the weights of total standardized weights for all features in the model are expressed as percents, they sum up to 1. Table 5 shows rather similar weights for the two programs. Important features in these models are the number of discourse units, followed by essay length, discourse unit length, and the two vocabulary usage features.

Performance comparison between two automated essay graders (prior art methods vs. current methods) was calculated. The results reported here are based on analyses of seven argument prompts and nine issue prompts from the GMAT. As described earlier, current methods may be utilized with three different approaches to model building and the optimizing of the fixed feature weights. The three model building approaches taken were prompt-specific (E20S), generic models with prompt-specific vocabulary usage features (E20Gvu), and fully generic models (E20G) without the vocabulary usage features. In the two generic model approaches a single model was built to score all argument prompts, and a second model was built to score all issue prompts. All three model building approaches used the same set of predetermined weights for the "number of words" feature.

Table 6 presents detailed performance results for several systems. A two-fold cross-validation to build and evaluate prompt-specific models was used with prior art methods (E13) and current methods (E20S). The data (human graded essays) were randomly divided into two (approximately) equal data sets. First, one half of the data were used for model building and the second half was used for cross-validation. This procedure was then repeated, but the set used for cross-validation in the previous run was now used for model building, and the one used for model building was used for cross-validation.

For model building and evaluation of the generic models, an n-fold cross-validation procedure is used, where n is equal to the number of prompts: 7 for argument, and 9 for issue. For each run, n−1 prompts was used for model building, and the $n^{th}$ prompt is held-out to evaluate (cross-validate) the model built in each fold. The procedure is repeated n times. The results are reported in Table 6, and are based on score assignments to the held-out data set in each fold.

atic too. Reliability is defined as the consistency of scores across administrations, but both the human-human and the machine-human relations are based on a single administration of only one essay. In addition, in this kind of analysis the machine-human relation would never be stronger than the human-human relation, even if the machine reliability would

TABLE 6

Average Kappas, Exact, and Adjacent Agreement with Resolved Human Score for Different Systems

| System | elw | N | Kappa Mean | Kappa STD | % Exact Agreement All | 1 | 2 | 3 | 4 | 5 | 6 | % Exact + Adjacent Agreement All | 1 | 2 | 3 | 4 | 5 | 6 |
|---|---|---|---|---|---|---|---|---|---|---|---|---|---|---|---|---|---|---|
| Argument | | | | | | | | | | | | | | | | | | |
| E20G | 0.2 | 7 | 0.35 | 0.08 | 50 | 38 | 37 | 39 | 65 | 54 | 48 | 91 | 86 | 68 | 89 | 97 | 99 | 93 |
| E20Gvu | 0.2 | 7 | 0.38 | 0.06 | 52 | 43 | 44 | 47 | 63 | 51 | 48 | 94 | 89 | 79 | 93 | 97 | 99 | 93 |
| E20S | 0.2 | 7 | 0.38 | 0.06 | 52 | 48 | 43 | 46 | 60 | 57 | 45 | 94 | 87 | 80 | 93 | 98 | 98 | 93 |
| E20G | 0.3 | 7 | 0.35 | 0.08 | 50 | 43 | 40 | 42 | 59 | 54 | 44 | 92 | 89 | 72 | 89 | 97 | 98 | 94 |
| E20Gvu | 0.3 | 7 | 0.39 | 0.07 | 52 | 46 | 43 | 48 | 53 | 65 | 51 | 93 | 88 | 78 | 90 | 97 | 98 | 98 |
| E20S | 0.3 | 7 | 0.38 | 0.07 | 52 | 42 | 43 | 46 | 62 | 53 | 48 | 94 | 86 | 81 | 93 | 98 | 99 | 93 |
| E13 | — | 7 | 0.36 | 0.07 | 51 | 42 | 43 | 49 | 58 | 50 | 50 | 93 | 81 | 83 | 94 | 96 | 97 | 91 |
| Issue | | | | | | | | | | | | | | | | | | |
| E20G | 0.2 | 9 | 0.42 | 0.05 | 56 | 46 | 46 | 50 | 64 | 55 | 60 | 96 | 87 | 88 | 94 | 98 | 99 | 97 |
| E20Gvu | 0.2 | 9 | 0.46 | 0.05 | 58 | 49 | 55 | 51 | 65 | 62 | 51 | 97 | 91 | 92 | 96 | 98 | 99 | 98 |
| E20S | 0.2 | 9 | 0.44 | 0.03 | 57 | 56 | 57 | 54 | 58 | 58 | 57 | 97 | 93 | 94 | 96 | 97 | 99 | 98 |
| E20G | 0.3 | 9 | 0.42 | 0.04 | 56 | 51 | 47 | 49 | 65 | 55 | 55 | 96 | 89 | 89 | 95 | 98 | 99 | 97 |
| E20Gvu | 0.3 | 9 | 0.44 | 0.04 | 57 | 52 | 57 | 55 | 58 | 56 | 59 | 97 | 93 | 94 | 96 | 97 | 98 | 98 |
| E20S | 0.3 | 9 | 0.44 | 0.03 | 57 | 56 | 56 | 55 | 58 | 55 | 59 | 97 | 93 | 94 | 96 | 97 | 99 | 97 |
| E13 | — | 9 | 0.40 | 0.05 | 54 | 45 | 46 | 47 | 60 | 58 | 57 | 96 | 91 | 90 | 95 | 97 | 99 | 98 |

Table Description: elw = Essay Length Weight; STD = standard deviation; All = Across all score points The feature set in the current methods (E20) is standardized across all three models. The 12 features of E20 are all correlated with human reader score, and are also more directly tied to scoring guide characteristics, such as error raters in grammar, usage, mechanics and style, vocabulary usage, and discourse units related to the organization and development of an essay. In addition, the contribution of essay length is a controlled feature in current methods, and its weight can easily be modified. The feature set used also lends itself to generic model building.

Reliability of E-rater.

Evaluations of automated essay scoring systems are usually based on single-essay scores. In these evaluations, the relation between two human rater scores and between a human and an automated score are usually compared. Although this comparison seems natural, it is also problematic in several ways.

In one sense this comparison is intended to show the validity of the machine scores by comparing them to their gold standard, the scores they were intended to imitate. The e-rater score is composed of a fixed set of features of writing that are not derived from the human holistic scores. The combination of the features is not necessarily based on optimal regression weights for the prediction of the human scores, and the difference in performance (relation with human score) between "optimal" and predetermined weights is very small. This means that the machine scores are not dependent on human scores: they can be computed and interpreted without the human scores.

In another sense the human-machine relation is intended to evaluate the reliability of machine scores, similarly to the way the human-human relation is interpreted as reliability evidence for human scoring. But this interpretation is problematic too. Reliability is defined as the consistency of scores across administrations, but both the human-human and the machine-human relations are based on a single administration of only one essay. In addition, in this kind of analysis the machine-human relation would never be stronger than the human-human relation, even if the machine reliability would be perfect. This is because the relation between the scores of two human raters to essays written to one prompt is an assessment of the reliability of human scoring for this prompt, or in other words, of the rater agreement reliability. Any other measure or scoring method for these prompt essays could not have a stronger relation with a human score than this rater reliability. Finally, this analysis takes into account only one kind of inconsistency between human scores, inter-rater inconsistencies within one essay, and not the inter-task inconsistencies. The machine scores, on the other hand, have perfect inter-rater reliability. All this suggests that it might be better to evaluate automated scores on the basis of multiple essay scores.

The data for this analysis comes from the Criterion SM essays that were compiled for grades six through twelve. The different prompts in each grade-level were designed to be parallel and exchangeable, and thus they could be viewed as alternate forms. The essays were chosen from the Criterion$^{SM}$ database to include as many multiple essays per student as possible. Consequently it was possible to identify in a set of 7,575 essays almost 2,000 students who submitted two different essays. These essays (almost 4,000 in total, two per student) were used to estimate the test-retest reliability of human and automated scoring. The computation of automated scores was based, in this analysis, on the average relative weights across programs from Table 3. This was done to avoid over-fitting as much as possible. Note that the weights chosen are not only sub-optimal on the prompt level, but they are not even the best weights at the grade level. The essay length weight was set to 20%, and since the results in this section are based on correlations, no scaling of scores was performed (since scaling would not change the results).

Table 7 presents the test-retest reliabilities of the automated scores, single human scores, and average human score ("AHS"), for each grade and overall. The table shows that the e-rater score has higher reliabilities than the single human rater (in five out of seven grades) and fairly equivalent reliabilities to the average of two human graders, with overall reliability of 0.60, higher than that of the AHS (0.58).

TABLE 7

Test-retest Reliabilities

| Grade | N | E-rater | Single human rater | AHS |
|---|---|---|---|---|
| Criterion 6th Grade | 285 | .61 | .48 | .65 |
| Criterion 7th Grade | 231 | .63 | .52 | .59 |
| Criterion 8th Grade | 334 | .54 | .49 | .58 |
| Criterion 9th Grade | 280 | .40 | .45 | .41 |
| Criterion 10th Grade | 352 | .52 | .52 | .57 |
| Criterion 11th Grade | 280 | .44 | .33 | .44 |
| Criterion 12th Grade | 225 | .76 | .63 | .74 |
| Overall | 1987 | .60 | .50 | .58 |

The estimation of human and machine reliabilities and the availability of human-machine correlations across different essays make it possible to evaluate human and machine scoring as two methods in the context of a multi-method analysis. Table 8 presents a typical multi-method correlation table. The two correlations below the main diagonal are equal to the average of the correlations between the first e-rater score and second human score (either single or average of two), and between the second e-rater score and first human score. Both pairs of correlations were almost identical. The correlations above the diagonal are the corrected correlations for unreliability of the scores. These correlations were almost identical for single and average of two human scores. The reliabilities of the scores are presented on the diagonal.

TABLE 8

Multi-method Correlations Across Different Prompts

| Score | E-rater | Single human rater | AHS |
|---|---|---|---|
| E-rater | .60 | .93 | .93 |
| Single human rater | .51 | .50 | — |
| AHS | .55 | — | .58 |

Note:
Diagonal values are test-retest reliabilities. Values above diagonal are corrected for unreliability of scores.

The main finding presented in Table 8 is the high corrected-correlation (or true-score correlation) between human and machine scores (0.93). This high correlation is evidence that e-rater scores, as an alternative method for measuring writing ability, is measuring a very similar construct as the human scoring method of essay writing. These findings can be compared to the relationship between essay writing tests and multiple-choice tests of writing (direct and indirect measures of writing).

Table 9 shows the results from another interesting analysis that is made possible with the multiple-essay data, namely the reliability of individual features. The table presents the test-retest reliability of each feature alongside the overall correlation with AHS and the relative weights used in this section.

TABLE 9

Test-retest Reliabilities of Individual Features

| Feature | Test-retest reliability | Weight | Overall correlation with AHS |
|---|---|---|---|
| Grammar | 0.07 | 0.05 | 0.16 |
| Usage | 0.16 | 0.02 | 0.20 |
| Mechanics | 0.36 | 0.07 | 0.34 |
| Style | 0.43 | 0.08 | 0.55 |
| Development | 0.48 | 0.21 | 0.65 |
| AEL | 0.32 | 0.12 | 0.17 |
| Type/Token | 0.38 | 0.04 | 0.44 |
| Vocabulary | 0.24 | 0.07 | 0.50 |
| AWL | 0.47 | 0.08 | 0.32 |
| Max. Cos. | 0.11 | 0.03 | 0.22 |
| Cos. W/6 | 0.25 | 0.03 | 0.32 |
| Essay length | 0.56 | 0.20 | 0.78 |

Note.
AEL = average discourse element length; AWL = average word length.

The table above shows that the essay length feature has the highest reliability (0.56), higher than the reliability of a single human rater and almost as high as the reliability of the entire e-rater score. The reliabilities of the style, development, and average word length (AWL) features are all at least 40%; the reliabilities of the mechanics, average element length (AEL), and the type/token ratio features are all at least 30%; the reliabilities of the vocabulary and cosine 6 correlation features are all at least 20%; and finally, the reliabilities of the grammar, usage, and max cosine value features are 16% and lower.

The comparison between the three columns of Table 9 show that there is a relatively high positive correlation between all three measures of feature performance: feature reliability, contribution in regression analysis, and simple correlations with AHS. The rank-order correlation between feature reliability and the other two measures is 0.78 in both cases.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

The invention claimed is:

1. A computer-implemented method of grading an essay, the essay being a response to a test prompt, comprising:
    deriving a set of predetermined features from the essay with a computer system, wherein the predetermined features comprise one or more features that are independent from the test prompt;
    evaluating the feature set with a scoring equation with the computer system;
    generating a raw score for the essay from the scoring equation with the computer system; and
    processing the raw score for the essay with the computer system, wherein an adaptive cutoff algorithm is utilized to assign the raw score to a score category, the adaptive cutoff algorithm comprising:
        collecting raw scored essays across all score categories, wherein the raw scored essays are graded by the automated deriving, evaluating, and generating steps and by human graders following scoring rubrics;
        determining an appropriate cutoff value set by maximizing an overall exact agreement between the automated grades and the human grades and a minimum lowest exact agreement between the automated grades and the human grades in a score category; and comparing the raw score generated by the deriving, evaluating, and generating steps to the selected cutoff set to obtain a score category for the essay.

2. The method of claim 1, wherein the score categories range from 1 to 6.

3. The method of claim 1, wherein the scoring equation is generated by a multiple regression analysis.

4. The method of claim 1, wherein the features includes error feedback features.

5. The method of claim 4, wherein the error feedback features comprise one or more of: grammar, usage, mechanics, stylistic errors.

6. The method of claim 1, wherein the features include lexical complexity features.

7. The method of claim 6, wherein the lexical complexity features comprise one or more of: a word frequency index, a ratio of word types to Tokens, total word count.

8. The method of claim 1, wherein the features include one or more prompt-specific content features.

9. The method of claim 8, wherein the content features are derived by comparing word usage of the essay to a batch of essays scored over the range of score categories.

10. The method of claim 9, wherein the comparing comprises:

generating argument partitioned text from the essay, said argument partitioned text comprising a structure identifier describing an aspect of the argument structure of the sentence;

for each of a plurality of score categories, each score category having a plurality of score category essays, creating a word weight vector for each of a set of argument words in the plurality of score categories essays;

creating a word weight vector for each of a set of argument words in the essay;

computing for each of the set of argument words in the essay, a cosine correlation between the argument word weight vector for a particular argument word in the essay and the word weight vector for the same argument word in the plurality of score category essays; and assigning to each of the set of argument words in the essay the score class having the highest cosine correlation.

11. The method of claim 10, wherein the step of creating a word weight vector for each of a set of argument words in the plurality of score category essays, comprises calculating the word weight vector using the following equation:

$$w_{i,s}=(freq_{i,s}/max\_freq_s)*\log(n\_essays_{total}/n\_essays_i);$$

wherein, $n\_essays_{total}$ is the total number of training essays, and $n\_essays_i$ is the number of essays containing $w_{i,s}$ and wherein $freq_{i,s}$ is the frequency of argument word "i" in score class "s," and $max\_freq_s$ is the frequency of the most frequent argument word in score class "s".

12. The method of claim 1, wherein the features comprise one or more of the following features:

length of the essay in total number of words;

percent of grammar errors with regard to total number of words;

percent of usage errors with regard to total number of words;

percent of mechanics errors with regard to total number of words;

percent of style feedback comments with regard to total number of words;

optimal number of discourse elements, wherein discourse elements are selected from the group consisting of background sentences, thesis sentences, main idea sentences, supporting idea sentences and conclusion sentences;

average word length of discourse elements;

score category to which the essay text is most similar with regard to vocabulary usage;

similarity of the essay vocabulary to the vocabulary used in essays scored in the highest score category;

ratio of number of words types to tokens in the essay;

vocabulary level; and average word length.

13. A computer program product for automatically grading an essay, the essay being a response to a test prompt, the computer program product comprising a non-transitory computer readable storage medium having computer executable instructions thereon for causing a computer system to execute steps comprising:

deriving a set of predetermined features from the essay, wherein the predetermined features comprise one or more features that are independent from the test prompt;

evaluating the feature set with a scoring equation;

generating a raw score for the essay from the scoring equation; and processing the raw score for the essay, wherein on an adaptive cutoff algorithm is utilized to assign the raw score to a score category, the computer executable instructions causing the computer system to execute steps according to the adaptive cutoff algorithm, comprising:

collecting raw scored essays across all score categories, wherein the raw scored essays are graded by the automated deriving, evaluating, and generating steps and by human graders following scoring rubrics;

determining an appropriate cutoff value set by maximizing an overall exact agreement between the automated grades and the human grades and a minimum lowest exact agreement between the automated grades and the human grades in a score category; and comparing the raw score generated by the deriving, evaluating, and generating steps to the selected cutoff set to obtain a score category for the essay.

14. The computer program product of claim 13, wherein the score categories range from 1 to 6.

15. The computer program product of claim 13, wherein the scoring equation is generated by a multiple regression analysis.

16. The computer program product of claim 13, wherein the features includes error feedback features.

17. The computer program product of claim 16, wherein the error feedback features comprise one or more of: grammar, usage, mechanics, stylistic errors.

18. The computer program product of claim 13, wherein the features include lexical complexity features.

19. The computer program product of claim 18, wherein the lexical complexity features comprise one or more of: a word frequency index, a ratio of word types to Tokens, total word count.

20. The computer program product of claim 13, wherein the features include one or more prompt-specific content features.

21. The computer program product of claim 20, wherein the content features are derived by comparing word usage of the essay to a batch of essays scored over the range of score categories.

22. The computer program product of claim 21, wherein the comparing comprises:

generating argument partitioned text from the essay, said argument partitioned text comprising a structure identifier describing an aspect of the argument structure of the sentence;

for each of a plurality of score categories, each score category having a plurality of score category essays, creating a word weight vector for each of a set of argument words in the plurality of score categories essays;

creating a word weight vector for each of a set of argument words in the essay;

computing for each of the set of argument words in the essay, a cosine correlation between the argument word weight vector for a particular argument word in the essay and the word weight vector for the same argument word in the plurality of score category essays; and assigning to each of the set of argument words in the essay the score class having the highest cosine correlation.

23. The computer program product of claim 22, wherein the step of creating a word weight vector for each of a set of argument words in the plurality of score category essays, comprises calculating the word weight vector using the following equation:

$$w_{i,s} = (\text{freq}_{i,s}/\text{max\_freq}_s) * \log(n\_\text{essays}_{total}/n\_\text{essays}_i);$$

wherein, $n\_\text{essays}_{total}$ is the total number of training essays, and $n\_\text{essays}_i$ is the number of essays containing $w_{i,s}$ and wherein $\text{freq}_{i,s}$ is the frequency of argument word "i" in score class "s," and $\text{max\_freq}_s$ is the frequency of the most frequent argument word in score class "s".

24. The computer program product of claim 13, wherein the features comprise one or more of the following features:
length of the essay in total number of words;
percent of grammar errors with regard to total number of words;
percent of usage errors with regard to total number of words;
percent of mechanics errors with regard to total number of words;
percent of style feedback comments with regard to total number of words;
optimal number of discourse elements, wherein discourse elements are selected from the group consisting of background sentences, thesis sentences, main idea sentences, supporting idea sentences and conclusion sentences;
average word length of discourse elements;
score category to which the essay text is most similar with regard to vocabulary usage;
similarity of the essay vocabulary to the vocabulary used in essays scored in the highest score category;
ratio of number of words types to tokens in the essay;
vocabulary level; and
average word length.

25. An automated essay scoring system comprising:
an input device configured to receive one or more essays to be graded;
an output device to display essays and scores to a user;
a processor for deriving a set of predetermined features of the one or more essays to be graded and for evaluating the feature set with a scoring equation to generate a raw score for the essay and for processing the raw score for the essay into a score category based on an adaptive cutoff algorithm, wherein the processor executes steps according to the adaptive cutoff algorithm, comprising:
collecting raw scored essays across all score categories, wherein the raw scored essays are graded by the automated deriving, evaluating, and generating steps and by human graders following scoring rubrics;
determining an appropriate cutoff value set by maximizing an overall exact agreement between the automated grades and the human grades and a minimum lowest exact agreement between the automated grades and the human grades in a score category; and
comparing the raw score generated by the deriving, evaluating, and generating steps to the selected cutoff set to obtain a score category for the essay; and
the system further comprising a computer-readable storage medium for storing the scoring equation, the adaptive cutoff algorithm and scored essay data, the computer readable storage medium in communication with the processor through a transmission device configured to electronically transmit the essays to the processor and to communicate between the processor and the storage medium.

26. The automated essay scoring system of claim 25, wherein the score categories range from 1 to 6.

27. The automated essay scoring system of claim 25, wherein the scoring equation is generated by a multiple regression analysis.

28. The automated essay scoring system of claim 25, wherein the features includes error feedback features.

29. The automated essay scoring system of claim 28, wherein the error feedback features comprise one or more of: grammar, usage, mechanics, stylistic errors.

30. The automated essay scoring system of claim 25, wherein the features include lexical complexity features.

31. The automated essay scoring system of claim 30, wherein the lexical complexity features comprise one or more of: a word frequency index, a ratio of word types to Tokens, total word count.

32. The automated essay scoring system of claim 25, wherein the features include one or more prompt-specific content features.

33. The automated essay scoring system of claim 32, wherein the content features are derived by comparing word usage of the essay to a batch of essays scored over the range of score categories.

34. The automated essay scoring system of claim 33, wherein the comparing comprises:
generating argument partitioned text from the essay, said argument partitioned text comprising a structure identifier describing an aspect of the argument structure of the sentence;
for each of a plurality of score categories, each score category having a plurality of score category essays, creating a word weight vector for each of a set of argument words in the plurality of score categories essays;
creating a word weight vector for each of a set of argument words in the essay;
computing for each of the set of argument words in the essay, a cosine correlation between the argument word weight vector for a particular argument word in the essay and the word weight vector for the same argument word in the plurality of score category essays; and
assigning to each of the set of argument words in the essay the score class having the highest cosine correlation.

35. The automated essay scoring system of claim 34, wherein the step of creating a word weight vector for each of a set of argument words in the plurality of score category essays, comprises calculating the word weight vector using the following equation:

$$w_{i,s} = (\text{freq}_{i,s}/\text{max\_freq}_s) * \log(n\_\text{essays}_{total}/n\_\text{essays}_i);$$

wherein, $n\_essays_{total}$ is the total number of training essays, and $n\_essays_i$ is the number of essays containing $w_{i,s}$ and wherein $freq_{i,s}$ is the frequency of argument word "i" in score class "s," and $max\_freq_s$ is the frequency of the most frequent argument word in score class "s".

36. The automated essay scoring system of claim 25, wherein the features comprise one or more of the following features:

length of the essay in total number of words;

percent of grammar errors with regard to total number of words;

percent of usage errors with regard to total number of words;

percent of mechanics errors with regard to total number of words;

percent of style feedback comments with regard to total number of words;

optimal number of discourse elements, wherein discourse elements are selected from the group consisting of background sentences, thesis sentences, main idea sentences, supporting idea sentences and conclusion sentences;

average word length of discourse elements;

score category to which the essay text is most similar with regard to vocabulary usage;

similarity of the essay vocabulary to the vocabulary used in essays scored in the highest score category;

ratio of number of words types to tokens in the essay;

vocabulary level; and average word length.

* * * * *